United States Patent [19]
Johnson et al.

[11] Patent Number: 5,388,909
[45] Date of Patent: Feb. 14, 1995

[54] OPTICAL APPARATUS AND METHOD FOR MEASURING TEMPERATURE OF A SUBSTRATE MATERIAL WITH A TEMPERATURE DEPENDENT BAND GAP

[76] Inventors: Shane R. Johnson; Christian Lavoie, both of 2626 Tennis Crescent, Vancouver, B. C., Canada, V6T 2E1; Mark K. Nissen, 215 - 2190 West 7th Avenue, Vancouver, B. C., Canada, V6K 4K7; J. Thomas Tiedje, 1752 Wesbrook Crescent, Vancouver, B. C., Canada, V6T 1W1

[21] Appl. No.: 121,521

[22] Filed: Sep. 16, 1993

[51] Int. Cl.$^6$ ............... G01K 11/00; G01J 5/48
[52] U.S. Cl. .................. 374/161; 374/120; 356/44
[58] Field of Search ............ 374/120, 161, 131; 356/44

[56] References Cited

U.S. PATENT DOCUMENTS

| | | | |
|---|---|---|---|
| 4,437,761 | 3/1984 | Kroger et al. | 374/161 |
| 4,703,175 | 10/1987 | Salour et al. | 374/161 |
| 4,841,150 | 6/1989 | Walter | 374/161 |
| 4,979,133 | 12/1990 | Arima et al. | 374/161 |
| 5,098,199 | 3/1992 | Amith | 374/161 |
| 5,118,200 | 6/1992 | Kirillov et al. | 374/120 |
| 5,213,985 | 5/1993 | Sandroff et al. | 374/161 |

FOREIGN PATENT DOCUMENTS 0225627  10/1986  Japan ................. 374/161

OTHER PUBLICATIONS

Hellman et al., "IR Transmission Spectroscopy of GaAs During Molecular Beam Epitaxy", J. Cryst. Growth 81, 38 (1987).
Weilmeier et al., "A New Optical Temperature Measurement Technique for Semiconductor Substrates in Molecular Beam Epitaxy", Can. J. Phys. 69, 422 (1991).
C. Lavoie et al., "Diffuse Optical Reflectivity Measurements on GaAs During Molecular Beam Epitaxy Processing", J. Vac. Sci. Technol. A 10, 930 (1992).
S. R. Johnson et al., "Semiconductor Substrate Temperature Measurement by Diffuse Optical Reflectance Spectroscopy in Molecular Beam Epitaxy", J. Vac. Sci. Technol. B 11, 1007 (1993).
Brochures of CI Systems Inc., 5137 Clareton Drive, Suite 220, Agoura Hills Calif. 91301 (Nov. 1993).

*Primary Examiner*—Diego F. F. Gutierrez
*Attorney, Agent, or Firm*—Oyen Wiggs Green & Mutala

[57] ABSTRACT

An optical method and apparatus for measuring the temperature of a substrate material with a temperature dependent bandgap. The substrate is illuminated with a broad spectrum lamp and the bandgap is determined from the spectrum of the diffusely scattered light. The spectrum of the light from the lamp is sufficiently broad that it covers the spectral range above and below the bandgap of the substrate. Wavelengths corresponding to photon energies less than the bandgap of the substrate are transmitted through the substrate and are reflected from the back surface of the substrate as well as from the front surface while the wavelengths corresponding to photon energies larger than the bandgap are reflected only from the front surface. If the front surface is polished the front surface reflection will be specular while if the back surface is rough the reflection from the back surface will be non-specular. The back surface reflection is detected with a detector in a non-specular location. From the wavelength of the onset of the non-specular reflection the bandgap can be determined which gives the temperature. The temperature is determined from the knee in the diffuse reflectance spectrum near the bandgap.

17 Claims, 18 Drawing Sheets

FIG. 5a
COLLECT DRS DATA

START

SCAN MONOCHROMATOR OVER WAVELENGTH RANGE $\lambda_o$ TO $\lambda_n$ AND COLLECT DATA FROM THE DETECTOR AT INTERVALS OF $\Delta\lambda$. A TYPICAL $\Delta\lambda$ IS 1 nm. STORE THE DRS DATA AS $DRS|_{\lambda=\lambda_i}$, $\lambda_i = \lambda_o + i\Delta\lambda$, (i=0,1,2,3, ... ,n).

FIND FIRST AND SECOND DERIVATIVE AND THEIR MAXIMA i = 0, MAX1 = 0, MAX2 = 0, N1 = 0, N2 = 0 i = i + 1 i > n ?  — YES

NO

COMPUTE AND STORE

FILTERED DATA: $\overline{DRS}|_{\lambda=\lambda_i}$

FIRST DERIVATIVE: $\dfrac{d\overline{DRS}}{d\lambda}\bigg|_{\lambda=\lambda_i}$

SECOND DERIVATIVE: $\dfrac{d^2\overline{DRS}}{d\lambda^2}\bigg|_{\lambda=\lambda_i}$ $\dfrac{d\overline{DRS}}{d\lambda}\bigg|_{\lambda=\lambda_i} >$ MAX1 ?

NO / YES

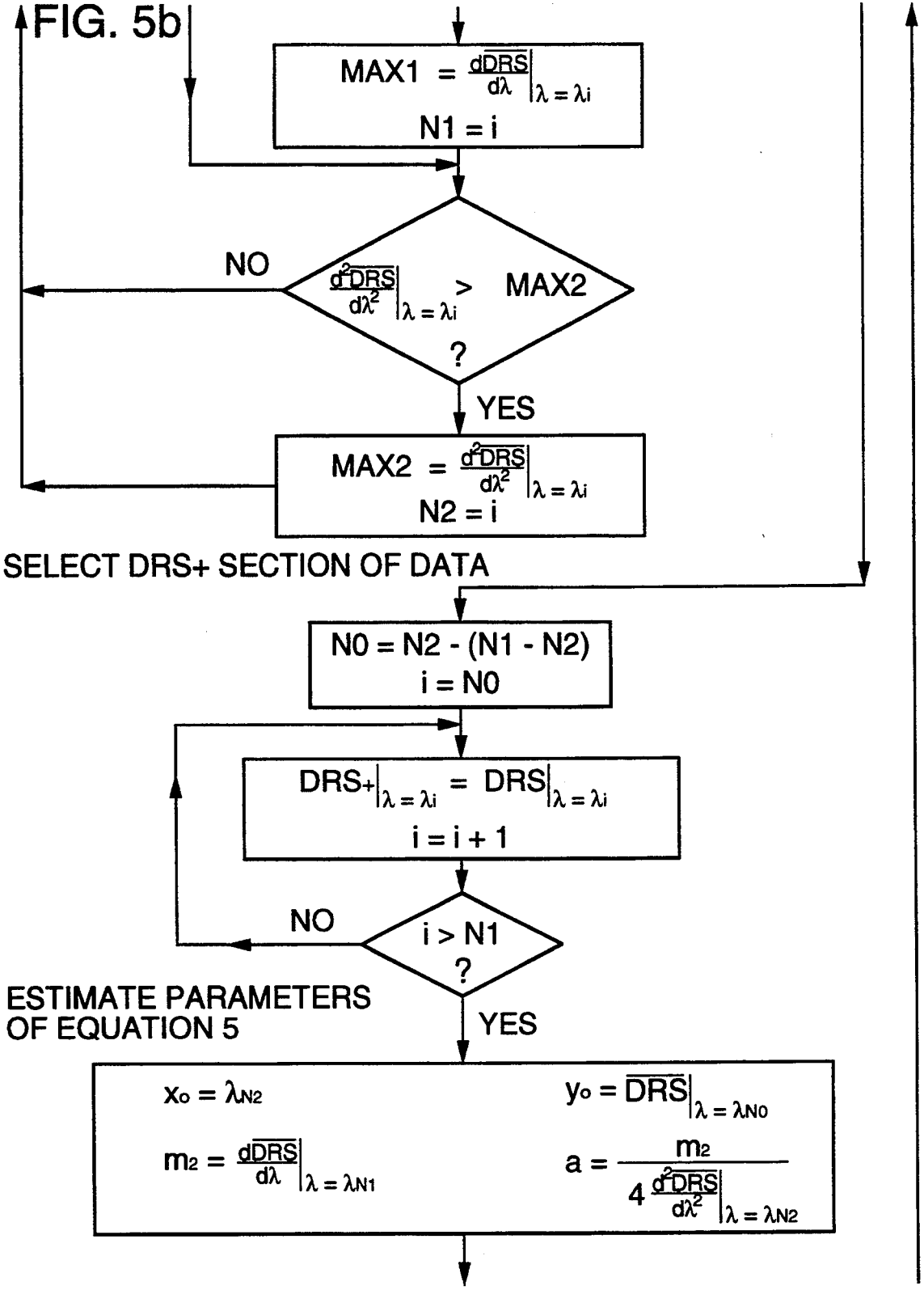

FIG. 7a
COLLECT DRS DATA

START

SCAN MONOCHROMATOR OVER WAVELENGTH RANGE $\lambda_o$ TO $\lambda_n$ AND COLLECT DATA FROM THE DETECTOR AT INTERVALS OF $\Delta\lambda$. A TYPICAL $\Delta\lambda$ IS 1 nm. STORE THE DRS DATA AS $DRS|_{\lambda=\lambda_i}$, $\lambda_i = \lambda_o + i\Delta\lambda$, (i=0,1,2,3,...,n).

FIND SECOND DERIVATIVE AND ITS MAXIMUM i = 0, MAX2 = 0, N2 = 0 i = i + 1 i > n ?  —YES→

NO

COMPUTE AND STORE

FILTERED DATA: $\overline{DRS}|_{\lambda=\lambda_i}$

SECOND DERIVATIVE: $\dfrac{d^2\overline{DRS}}{d\lambda^2}\bigg|_{\lambda=\lambda_i}$ $\dfrac{d^2\overline{DRS}}{d\lambda^2}\bigg|_{\lambda=\lambda_i} > $ MAX2 ?

NO

YES

MAX2 = $\dfrac{d^2\overline{DRS}}{d\lambda^2}\bigg|_{\lambda=\lambda_i}$
N2 = i

FIG. 7b

SELECT SECTION OF
SECOND DERIVATIVE
PEAK TO BE FIT $i = N2, j = N2$
$f(\lambda_i) = \left.\frac{d^2DRS}{d\lambda^2}\right|_{\lambda = \lambda_i}$ $\left.\frac{d^2DRS}{d\lambda^2}\right|_{\lambda = \lambda_i} > 0.7\ \text{MAX2}\ ?$ — NO →

YES ↓

$i = i + 1$  $\qquad$  $j = j - 1$
$f(\lambda_i) = \left.\frac{d^2DRS}{d\lambda^2}\right|_{\lambda = \lambda_i}$ $\qquad$ $f(\lambda_j) = \left.\frac{d^2DRS}{d\lambda^2}\right|_{\lambda = \lambda_j}$
$N1 = i$ $\qquad\qquad$ $N0 = j$

DETERMINE KNEE

COMPUTE THE EXACT PEAK OF THE SECOND DERIVATIVE OF THE DRS DATA, $\lambda_{peak}$, BY LEAST SQUARES FITTING A QUADRADIC EQUATION TO THE DATA SET $f(\lambda_i)$, (i=N0,N0+1,N0+2, ... ,N0-2, N1-1, N1).  $\lambda_{knee} = \lambda_{peak}$

CALCULATE TEMPERATURE

COMPUTE TEMPERATURE FROM CALIBRATION CURVE $T(\lambda_{knee})$

/OUTPUT TEMPERATURE/

UPDATE TEMPERATURE ? — YES →

NO ↓

STOP

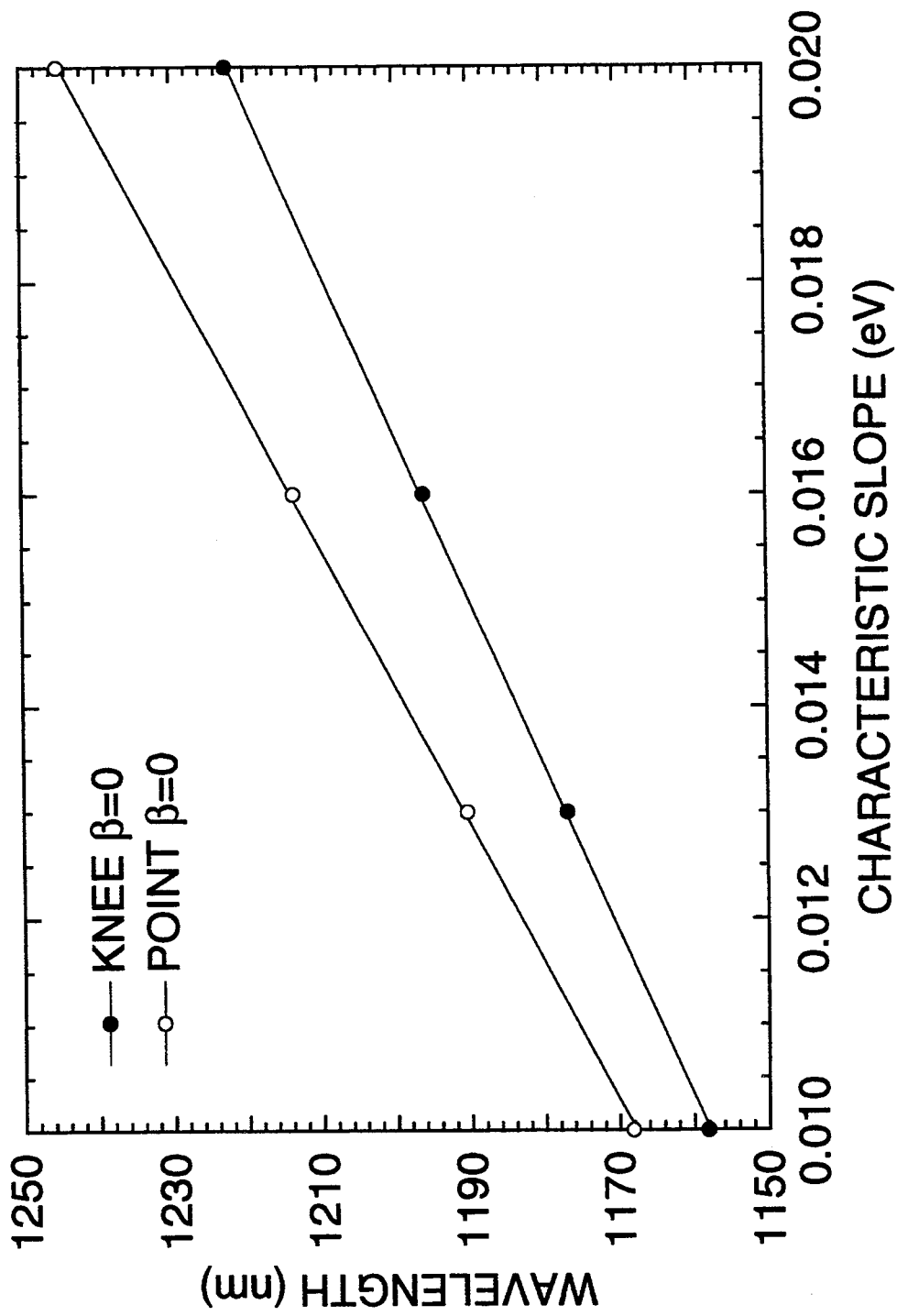

OPTICAL APPARATUS AND METHOD FOR MEASURING TEMPERATURE OF A SUBSTRATE MATERIAL WITH A TEMPERATURE DEPENDENT BAND GAP

FIELD OF THE INVENTION

This invention relates to thermometry and to methods and devices for making non-contact measurements of the temperature of substrate materials in various process environments including molecular beam epitaxy, chemical vapor deposition, plasma assisted chemical vapor deposition, plasma etching, metal organic chemical vapor deposition, sputtering and rapid thermal annealing.

BACKGROUND OF THE INVENTION

The substrate temperature is frequently an important parameter in thin film deposition and semiconductor processing operations. The substrate temperature and its uniformity can have a large effect on the quality and composition of the deposited layers. In molecular beam epitaxy for example, the substrate wafer is normally heated radiatively and rotated during the thin film growth operation. Physical contact between the wafer and a temperature sensor is not practical nor desirable because the sensor itself would cause local perturbations in temperature or even contamination of the substrate. Even if the wafer is not rotating, and heating is accomplished by thermal contact with a temperature regulated support, the temperature of the substrate can deviate substantially from the temperature of the support because of thermal contact problems which frequently exist in typical vacuum processing environments. Thus a non-contact method for measuring the temperature of the substrate is needed.

The simplest non-contact temperature measurement technique is to place a thermocouple close to the substrate so that it is in radiative contact with the substrate. While this solution is simple and cheap its accuracy is not adequate. In fact in molecular beam epitaxy it is not uncommon to have temperature errors of 100° C. with this approach.

Optical pyrometry is another method for measuring the temperature of an object without touching it. However pyrometry has serious deficiencies for semiconductor processing applications. A pyrometer works by detecting the intensity of the thermal radiation that is emitted by any object that is not at the absolute zero of temperature ($-273°$ C.). The spectrum of the thermal emission depends on the product of the spectral dependence of the emissivity of the object and the emission spectrum of a black body at that temperature. For the temperature range of interest in semiconductor processing, namely between about 0° C. and 1100° C., the peak in the blackbody spectrum is in the infrared. However the emissivity of semiconductors is normally low in the infrared because semiconductors are transparent at long wavelengths. This means that the radiation that must be detected by the pyrometer is relatively weak which limits the temperature range of the technique for semiconductors to $>500°$ C. for standard commercial pyrometers such as the instrument manufactured by IRCON. The transparency of semiconductors in the infrared also means care must be taken not to inadvertently measure the temperature of whatever is behind the semiconductor substrate, usually the heater. Yet another complication with pyrometers has to do with losses in optical elements used to transport the substrate radiation to the detector. In semiconductor processing operations it is not uncommon for optical elements such as windows and mirrors to become coated during the process. This affects the intensity of the thermal radiation from the substrate that reaches the detector which causes temperature errors. While the pyrometer can be useful for semiconductor temperature measurements it is not the complete answer.

It has been recognized for some time that the bandgap of a semiconductor is a reliable indicator of the temperature of the semiconductor because the bandgap is typically a smooth, almost linear function of temperature, in the 0°–1000° C. temperature range. Once the bandgap is known the temperature can be inferred from a one-time calibration for the particular material of interest. Various optical methods have been proposed for measuring the bandgap of the substrate. In the method of Hellman et al (J. Cryst. Growth 81, 38 (1987)) the radiation from heater filaments behind the substrate is transmitted through the substrate and detected by a detector outside the process chamber. By measuring the spectrum of the transmitted light they are able to infer the bandgap and hence the temperature. This method suffers from the variability in the intensity of the heater radiation as a function of the temperature of the heater. For example at low temperatures the heater produces very little radiation which makes accurate temperature measurements difficult.

To solve this problem Kirillov et al (U.S. Pat. No. 5,118,200) put a small lamp behind the substrate as an additional, brighter source of radiation. This increases the sensitivity of the measurement but introduces additional complications in the heater design. Because it is not practical to rapidly modulate the intensity of the light behind the substrate, this technique is not compatible with lock-in detection techniques which means that it is not possible to exclude background light from hot filaments or effusion ovens that may also be radiating in the same spectral range. In addition, with a fixed light source internal to the process chamber it is difficult to spatially resolve the temperature across the substrate. Temperature uniformity is a critical problem in growth of reproducible device structures with high yield.

These problems were solved by Weilmeier et al (Can. J. Phys. 69, 422 (1991)) who put the light source outside the process chamber and determined the bandgap from the spectrum of the back scattered light. In this method since the light source is outside the process chamber it does not interfere with the heater and is relatively easy to chop with a mechanical chopper. This makes lock-in detection techniques possible so that stray light from other sources can be rejected. To further enhance the sensitivity Weilmeier et al textured the back surface of the substrate and placed the detector in a non-specular position. The important optical signal in measuring the bandgap is the signal which is transmitted through the substrate. The diffuse reflection technique of Weilmeier et al detects only that part of the back scattered signal which has been transmitted through the substrate; the reflected signal from the front surface is specular and does not reach the detector which is located away from the specular reflection. This has the effect of eliminating the background signal reflected from the front surface of the substrate and thus reduces the sensitivity of the measurement to the surface properties of the substrate which are irrelevant as far as the temperature is concerned. A practical method for coupling the incident light into the growth chamber, and coupling the scattered light out of the growth chamber onto a photodetector using optical mirror ports and an optical fiber bundle has been demonstrated for the detection of scattered laser light by Lavoie et al (J.Vac.Sci. Technol. A10(4), 930 (1992)).

An elementary analysis method can be used to obtain a qualitative estimate of the bandgap from the diffuse reflection spectrum, for example by taking the wavelength where the diffuse reflectance is 50% of the peak value. Qualitatively the bandgap is at the wavelength where the diffusely scattered light intensity increases. However to determine the temperature accurately and reproducibly with a minimum of calibrations requires a precise procedure for finding an optical signature of the bandgap that can be related to the temperature. The point of inflection in the transmitted or reflected optical signal has been proposed by Kirillov et al as such an optical signature in the case of specular optical signals. The point of inflection measures a point on the absorption spectrum that lies below the optical bandgap. For maximum accuracy it is desirable to measure a point on the optical spectrum as close to the bandgap as possible. This is because the absorption below the bandgap is a variable depending on the quality of the material and the doping density as is well known in the art. For accurate measurements of the absolute temperature it is desirable to have a technique which is as insensitive as possible to properties of the material that can vary between different specimens. The problems with absorption below the bandgap are exacerbated in the case of the diffuse reflection method where the back scattered signal experiences multiple reflections inside the substrate and hence has an effective long path inside the substrate. Also at high doping levels and high temperatures, or in small bandgap materials such as silicon, where the substrate is not transparent in the wavelength range below the bandgap, the point of inflection method is sensitive to the thickness of the substrate. This problem cannot simply be solved by calibration without first knowing the temperature dependence of the transmission of the substrate. The problem is particularly severe in the case of the diffuse reflection method where the internal optical path length can be large compared with the substrate thickness.

SUMMARY OF THE PRESENT INVENTION

This invention describes an optical method for measuring the temperature of semiconducting or insulating substrates accurately and repeatably in real time that is useful for, but not limited to, measuring the temperature of semiconductor substrates in molecular beam epitaxy and in silicon processing. A mathematical algorithm is provided for locating the knee in the spectrum of the reflectance as a function of wavelength which is a signature in the reflectance spectrum which is close to the optical bandgap and can be used to make an accurate determination of the temperature, after calibration.

BRIEF DESCRIPTION OF THE FIGURES

FIGS. 5a, 5b, and 5c. Flow chart for determining the knee using Algorithm A.

FIGS. 7a and 7b. Flow chart for determining the knee using Algorithm B.

FIGS. 14a and 14b. Model calculation of the wavelength of the point of inflection and of the knee for the DRS spectrum as a function of the slope of the Urbach edge in GaAs.

DESCRIPTION OF THE INVENTION

Figure 1:
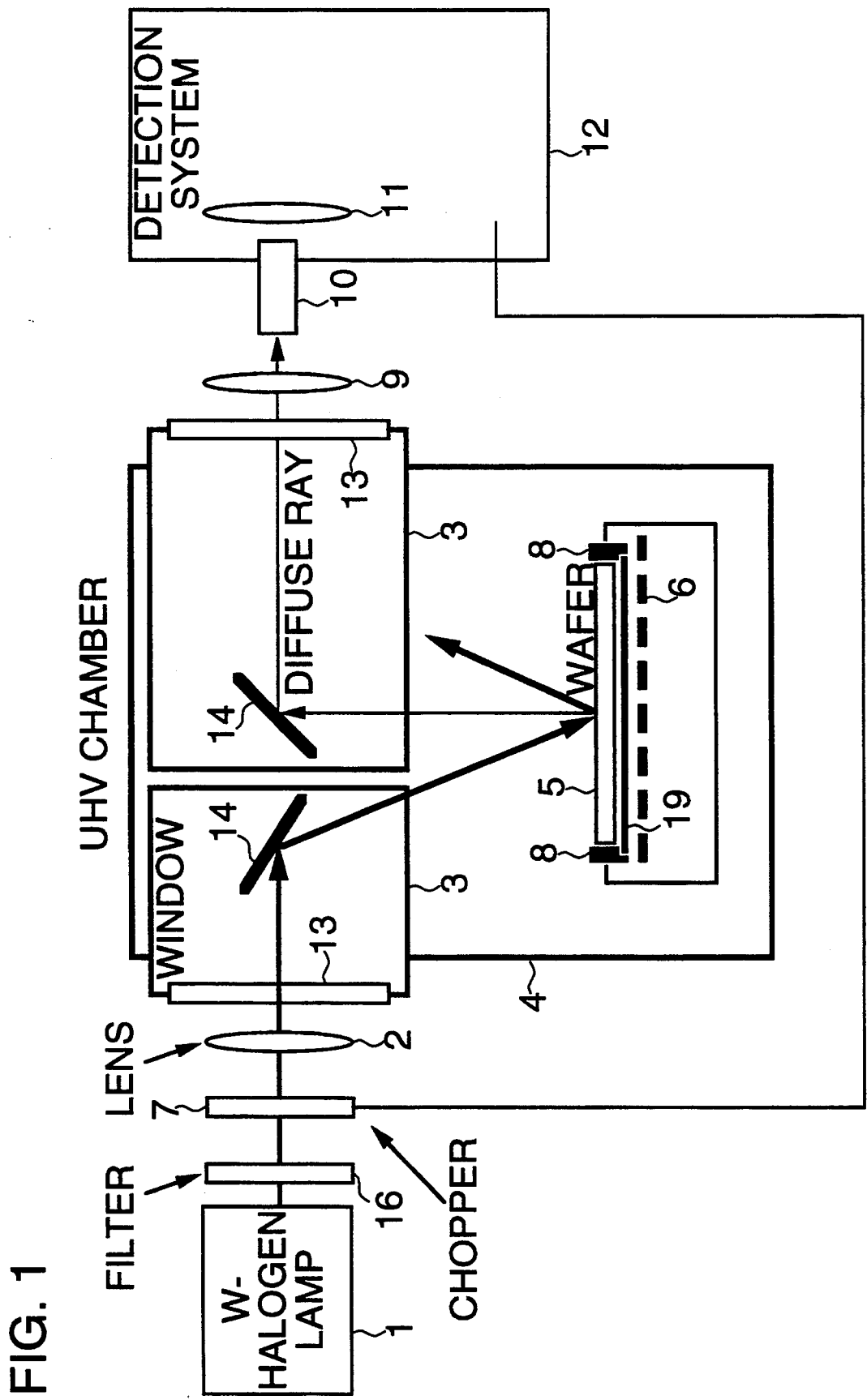
FIG. 1. Diagram of the optical subsystem for diffuse reflectance measurements.

As critical dimensions in semiconductor devices have become progressively smaller and device designs progressively more sophisticated, the requirements for control over the fabrication processes have become more stringent. For example semiconductor lasers for telecommunications will in the near future contain quantum well or multiple quantum well structures in which the allowed tolerances on the individual layer thicknesses will be in the range of a few atomic layers. At the same time the composition of these layers will needed to be controlled to of order 1% to obtain desirable emission wavelengths. Ideally the optimum properties of the layers need to be held fixed over the entire surface of a 3 inch diameter wafer in order to achieve a high yield of good devices.

Semiconductor lasers are now manufactured from compound semiconductor alloys containing two to four different alloying elements from group II, III, V or VI in the periodic table. Thin epitaxial films of these materials are fabricated typically by chemical or physical vapor deposition techniques such as metal organic chemical vapor deposition or molecular beam epitaxy (MBE). In these deposition processes the temperature of the substrate during the epitaxial film growth affects the electronic properties of the film, such as the non-radiative recombination lifetime of electrons and holes. In the case of GaAs thin films the optimum growth temperature is near 600° C. while the optimum growth temperature for AlGaAs is higher, close to 700° C. In addition the temperature of the substrate affects the composition of the film. For example at the high temperatures needed to grow high quality AlGaAs the vapor pressure of the Ga is high enough that some of the deposited Ga evaporates. The fraction of the Ga which evaporates depends critically on the temperature so that even a small change in the substrate temperature will change the composition of the film. Thus for high uniformity in the composition and electronic properties of the epitaxial layer it is important to have a controlled and uniform temperature during growth. To achieve this objective it is important to be able to measure the wafer temperature at any location on the wafer quickly and accurately. In this patent we use the terms wafer and substrate interchangeably.

Most commonly a single wafer is processed at a time in MBE. The wafer is usually supported around its perimeter by a refractory metal ring to which it is held by a spring clip or metal tabs and the entire assembly is moved around from the entry lock to a preparation chamber, and into the growth chamber by externally operated manipulators. The wafer is heated radiatively from the back and rotated during growth to improve uniformity. Direct contact between the wafer and a temperature probe is not desirable or practical because of the potential for contamination, damage, and local temperature perturbation caused by the probe. To solve these problems with temperature measurements we have developed a new optical method for measuring the temperature which we will call diffuse reflectance spectroscopy or DRS. This method is superior to competing optical techniques in that it is compatible with temperature profiling, it is insensitive to the optical properties of the front surface and changes in the transmission of optical elements in the system and it requires only a one time calibration for each type of substrate wafer.

The optical subsystem of the DRS method is shown in FIG. 1. With reference to FIG. 1 a broad spectrum lamp 1 is chopped with a mechanical chopper 7 and focused using a lens 2 through an optical mirror port 3 into the process chamber 4 on a semiconductor substrate 5 heated from the back by a filament or foil heater 6. The purpose of the mirror port is to ensure that the optical window 13 is not in the line of sight of the substrate. If the substrate is in the line of sight some of the deposited material may re-evaporate on the window and eventually spoil its transmission. The optical through put is much less sensitive to coating on the mirror 14 than on a window. An alternative commercially available solution that may be effective is a heated window. In a preferred embodiment the broad spectrum lamp is a tungsten halogen lamp and a long pass filter 16 is placed at the output of the lamp to eliminate the short wavelength light not close to the bandgap of the semiconductor. This filter is used to reduce the heat load of the lamp on the substrate and to eliminate short wavelength light which could scatter somewhere inside the growth reactor and find its way into the detector as second order in the monochromator. As an alternative to the plane mirrors 14 shown in FIG. 1, off-axis parabolic mirrors can be used for one or both optical ports. The parabolic mirror is collecting and focusing the light as well as directing it onto the substrate. With suitable parabolic mirrors, lens 2 and 9 are not needed.

In a preferred embodiment the semiconductor substrate 5 is polished on the front and textured on the back. For GaAs substrates a suitable texture can be obtained with a nitric acid etch as is well known in the art. Alternatively the back of the substrate can be lightly sand blasted with a pencil type sandblaster. This method is effective for silicon and InP as well as GaAs. Although a strongly textured back surface maximizes the DRS signal the method also works well with an unpolished saw-cut back surface but at a lower signal level. In another preferred embodiment a pyrolytic boron nitride (PBN) diffuser plate 19 is placed behind the substrate 5. Ideally the diffuser plate is placed immediately behind the substrate, attached to the same refractory metal holder as the substrate. The high thermal conductivity PBN diffuser plate has the dual function of conducting heat laterally to minimize thermal gradients in the substrate as well as providing a surface with the high diffuse reflectivity needed to generate a strong DRS signal.

In practice the morphology of the back surface of the GaAs wafer changes during the time that it spends at the growth temperature because of surface diffusion and evaporation. If for example growth is carried out at 700° C. as is believed to be optimal for growth of AlGaAs there will be some decomposition of the back surface of the substrate due to loss of As and some small Ga droplets will form. These changes in the back surface can affect its optical scattering properties. For this reason it is important that the method of analysis of the DRS spectrum be as insensitive as possible to the exact scattering characteristics of the back surface of the substrate.

The light from the halogen lamp 1 is focused by the lens 2 in such a way that the wafer is uniformly illuminated while minimizing the light on the metal ring 8 which holds the wafer. Alternatively if one is not interested in profiling the temperature of the substrate or if the substrate is smaller than 2 inches in diameter the lamp may be focused on an approximately 2 cm$^2$ spot on the center of the wafer for improved signal quality.

A fraction R of the light incident on the front surface of the wafer is specularly reflected, where R is the reflectivity of the front surface. For GaAs at a wavelength of 1000 nm R is about 0.3. The remaining fraction 1-R of the light is transmitted through the front surface into the wafer or substrate. In the infrared region of the spectrum (1 > 1000 nm) a semi-insulating GaAs wafer at room temperature will be transparent. In this case the transmitted beam will propagate to the back surface of the substrate where it will reflect diffusely because of the roughness of the back surface. Diffuse reflection means a reflection in which Snell's law is not obeyed, that is the angle of incidence is not equal to the angle of reflection. Diffuse reflections commonly occur from surfaces such as paper that are microscopically rough. Some of the diffusely reflected light will be outside the critical angle for total internal reflection from the inside of the front surface and will be trapped inside the semiconductor until a subsequent scattering event at the back surface scatters it back into the escape cone and it can escape out the front of the wafer. This light trapping effect is described in more detail in U.S. Pat. No. 4,514,582.

The scattered light exciting from the front surface will be spread out over a broad range of angles, and in particular some of the scattered light will be collected by lens 9 and focused into an optical fiber bundle 10 and then through another collecting lens 11 into a light detection system 12. In the preferred embodiment the cross section of the optical fiber bundle is round with a diameter of 3 mm at the input end and rectangular with a width of 1 mm at the exit end in order to maximize the coupling with the entrance slit of the monochromator in the detection system 12. The detection system 12 is wavelength selective. In a preferred embodiment it consists of a grating monochromator followed by a cooled InGaAs photodiode detector. A cooled Ge photo diode is also effective for GaAs or InP substrates. The detection system must be sensitive to a range of wavelengths spanning the optical bandgap in the temperature range of interest. A suitable spectral resolution for the detection system is 1 nm. In an alternative embodiment a filter wheel, containing a series of bandpass interference filters which can be individually positioned in front of the detector, replaces the monochromator.

Figure 2:
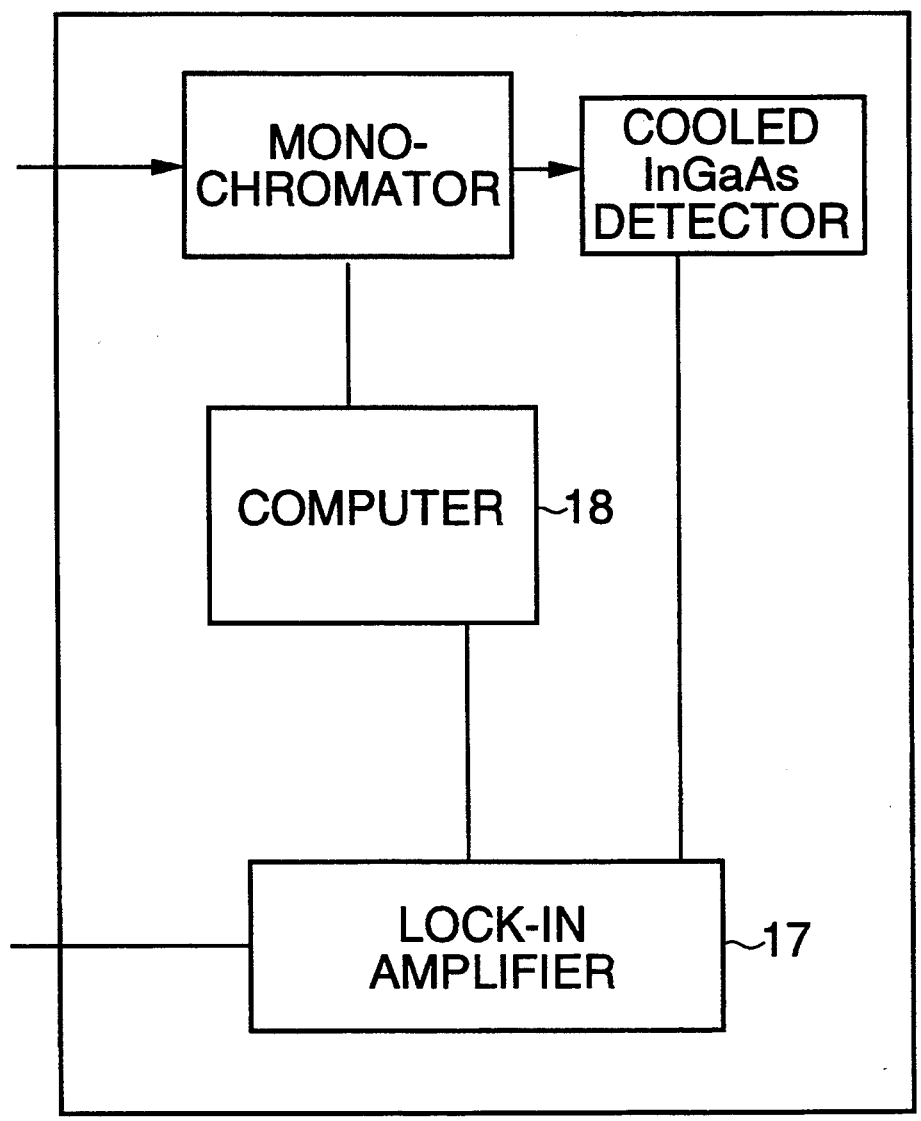
FIG. 2. Block diagram of one embodiment of the temperature measuring system.

For short wavelengths in the range above the bandgap of the substrate, which for room temperature GaAs includes the visible part of the spectrum, the light from the lamp that is transmitted through the front surface of the wafer is absorbed before it reaches that back of the substrate. Thus only the long wavelength light that is transmitted through the substrate is diffusely scattered into the detection system 12. A block diagram of the electronic and computer system used to collect the DRS data is shown in FIG. 2. The spectrum of the diffusely back scattered light is obtained by scanning the wavelength selective detection system through the wavelength region in the vicinity of the substrate's bandgap. In a preferred embodiment the monochromator is controlled by a computer which analyzes the data according to the algorithm described below in order to determine the temperature. As an alternative to scanning a monochromator through the wavelength region of interest one can also use a spectrograph technique in which the wavelengths of interest are first dispersed in angle by a grating then the intensity of the signal as a function of wavelength is determined with an array detector. The array detector can then be read out with the computer.

The detector output is amplified with a lock in amplifier 17 such as the Stanford Research Systems SR530 whose reference signal comes from the mechanical chopper 7. The output of the lock in amplifier and the wavelength setting of the monochromator are then recorded by the computer 18. A spectral resolution of about 1 nm is adequate for GaAs substrates under most conditions. After a dwell time, which in the preferred embodiment is 1 sec at each wavelength, the computer steps the monochromator to the next wavelength where the lockin output and wavelength are recorded again. In this way a complete spectrum is recorded extending 10–100 nm in wavelength above and below the bandgap. In an alternate embodiment the dwell time at each wavelength is 0.1 sec with lower signal to noise ratio.

Figure 3:
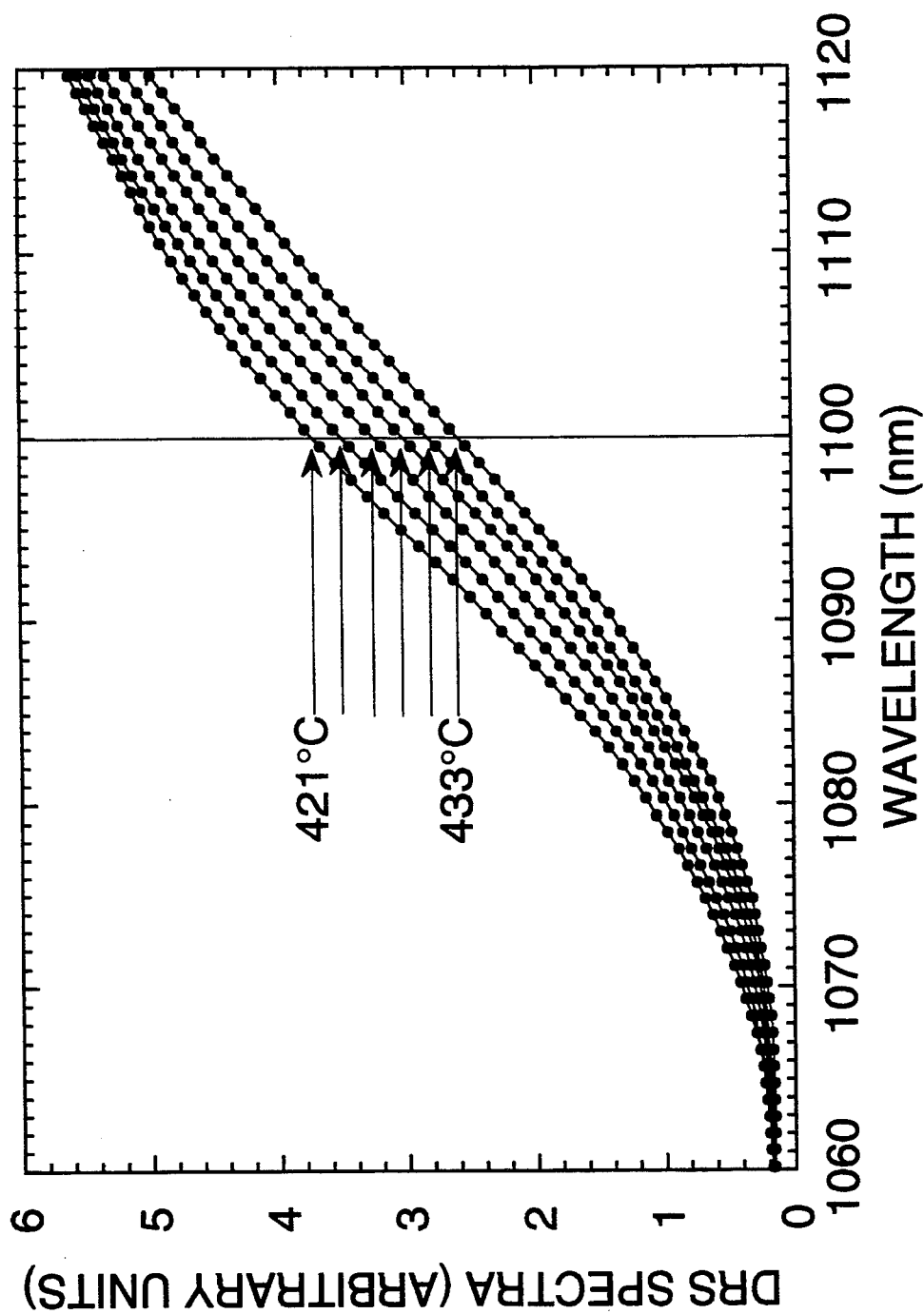
FIG. 3. Typical diffuse reflectance spectra as a function of temperature for a semi-insulating GaAs substrate.

A typical diffuse reflectance spectrum for a semiinsulating GaAs substrate for a series of different temperatures is shown in FIG. 3. These spectra show clearly the transition region near the bandgap where the substrate changes from being opaque with a DRS signal near zero to being transparent with a DRS signal that is large. FIG. 3 also clearly shows the increase in the wavelength or equivalently the reduction in the energy of the bandgap with increasing temperature. There is no clearly defined feature in the smooth DRS curves which corresponds to the generally accepted definition of the bandgap. In fact the bandgap lies in the short wavelength section of the spectrum where the DRS signal is near zero. Rather than the bandgap we use the knee in the spectrum where the DRS signal begins to increase as a spectral feature that can be related to the temperature of the substrate. This spectral feature is close to the bandgap but not equal to it. A precise definition of the knee is given below along with two mathematical algorithms for finding the knee in a DRS spectrum.

Algorithms for Finding the Knee

Figure 4:
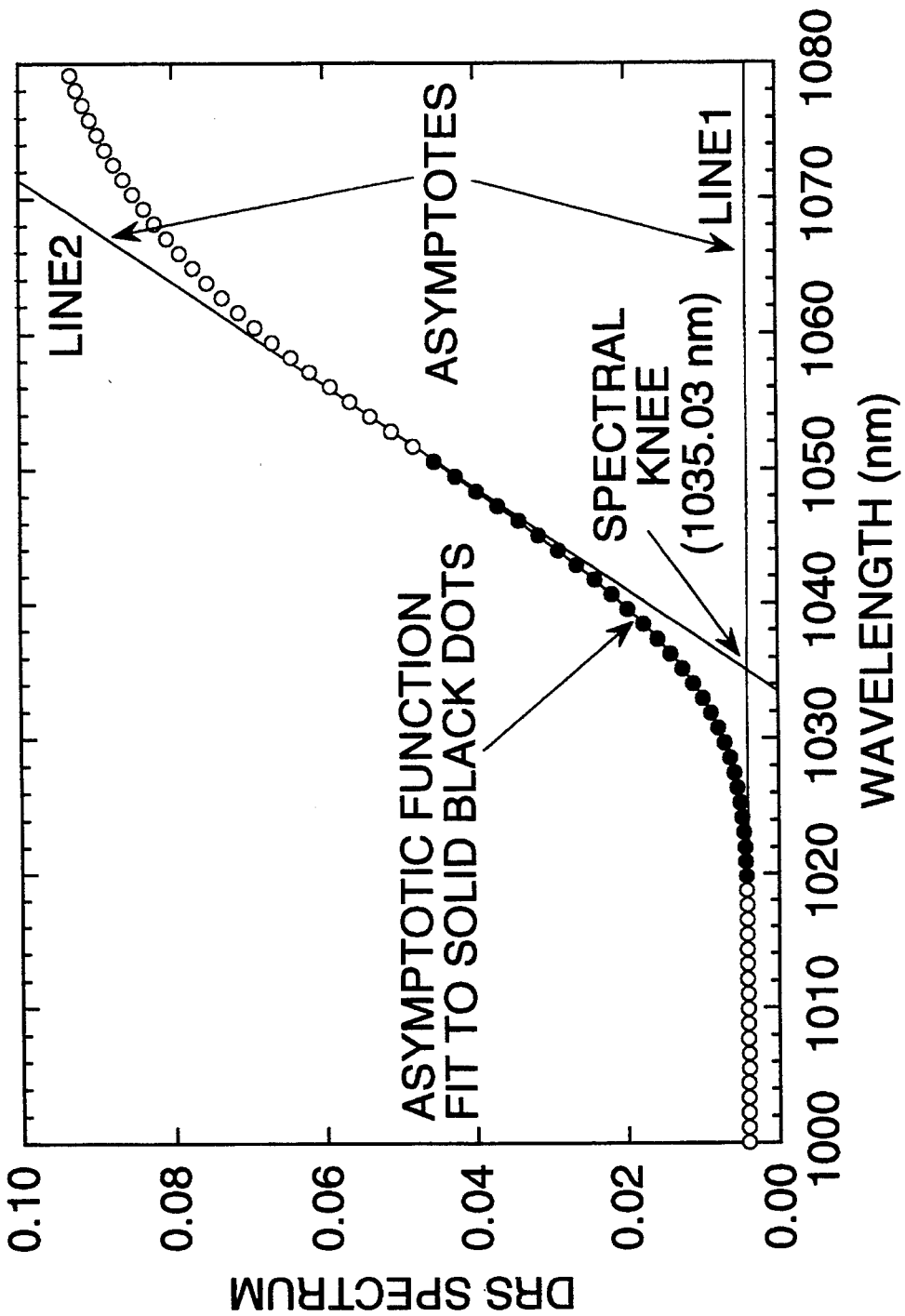
FIG. 4. Illustration of a fit to the diffuse reflection spectrum using Algorithm A showing the location of the knee in the spectrum.

The DRS spectrum has a sharp bend in the wavelength region at the onset of substrate transparency. This region of the DRS spectrum is shown in FIG. 4. Consider the following two straight lines: Line 1, determined by linear extrapolation through the background at the wavelengths shorter than the transparency wavelength of the DRS spectrum and Line 2, determined by linear extrapolation through the data points closest to the steepest part of the DRS spectrum. These lines are the asymptotes to the positive curvature section of the DRS spectrum indicated by the solid dots in FIG. 4. These two linear functions intersect at the wavelength adjacent to the sharpest bend in the DRS spectrum and are shown in FIG. 4. The intersection of these two lines assigns an analytical definition to the sharpest part of the positive curvature bend in the DRS spectrum. The wavelength of highest positive curvature in the DRS spectrum will henceforth be defined as the "knee" of the DRS spectrum.

In a first algorithm (algorithm A), the knee of the DRS spectrum data is mathematically determined by fitting an asymptotic function to the section of the DRS spectrum data with positive curvature. The section of DRS spectrum data with positive curvature is shown in FIG. 4 as the solid black dots and will be referred to as the "DRS+" data. In general the asymptotic function will be of the form $$y = f(x-x_o) \text{ with } f(x-x_o)_{x\to 0} \to \text{Line 1 and}$$
$$f(x-x_o)_{x\to\infty} \to \text{Line 2,} \quad (1)$$

where the DRS knee, xo, is a fitting parameter and the asymptotes of $f(x-x_o)$ intersect at xo. The maximum in the second derivative of the asymptotic function occurs at the knee.

In a preferred embodiment the asymptotic function has the form $$y = y_o + m_1(x-x_o) + am_2 ln[1 + exp((x-x_o)/a)], \quad (2)$$

where $y_o + m_1(x-x_o)$ is the linear back ground (with slope $m_1$) asymptote Line 1, $m_2$ is the slope of the asymptote Line 2, and the parameter a determines how sharply the DRS spectrum is bent at the knee. This form of the asymptotic fitting function $f(x-x_o)$ gives an excellent fit to the DRS+ spectrum from GaAs substrates. The DRS+ data is fit to the function $y = f(x-x_o)$ using a computer and the DRS+ data is selected by visual inspection or with a computer. In a preferred embodiment the DRS+ data is selected from the DRS spectrum around the knee as that part of the data that has a second derivative greater than zero.

Figure 5C:
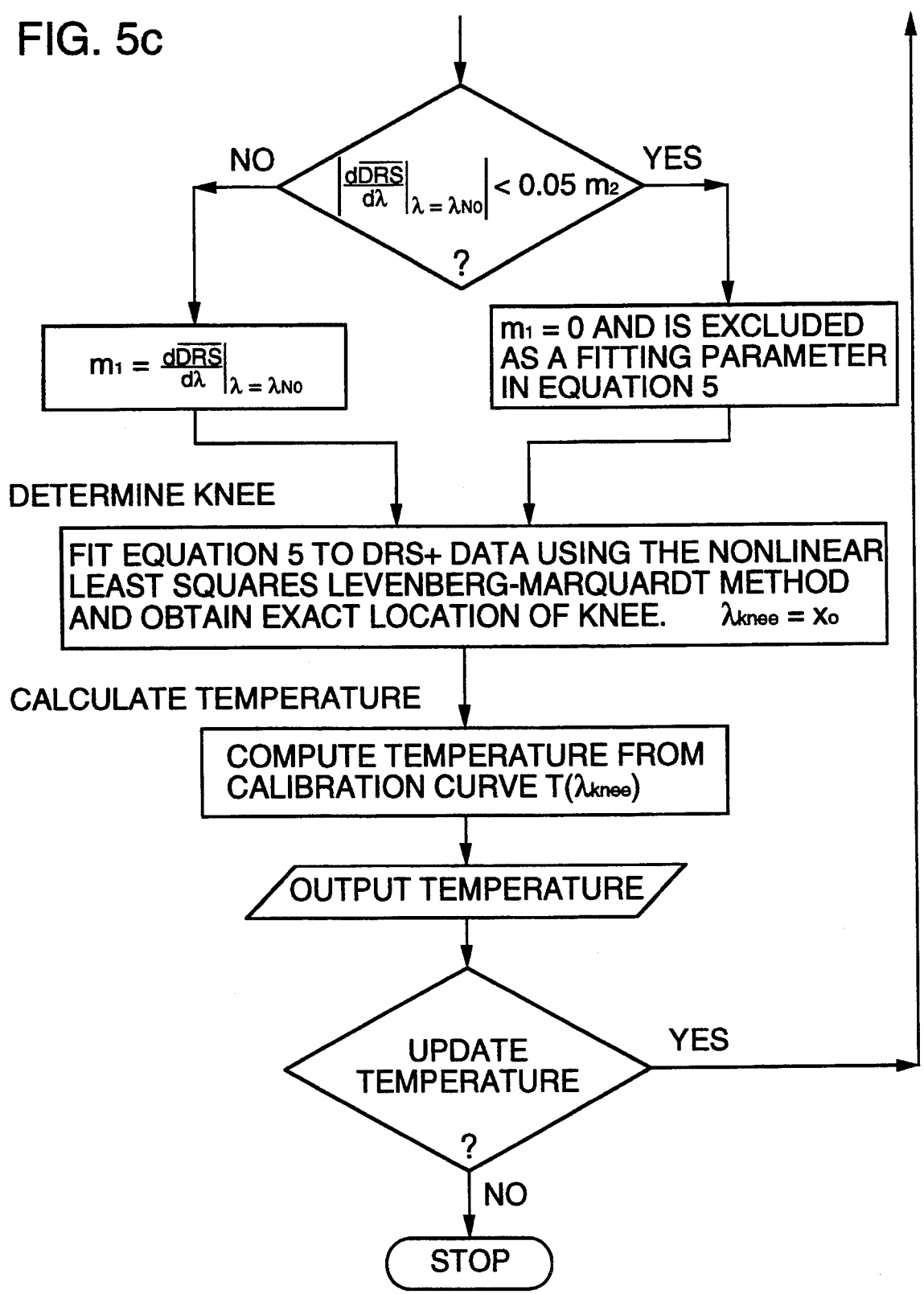

The flow chart for determining the exact position of the knee, using algorithm A, is given in FIGS. 5a through 5c. The DRS signal versus wavelength is collected from the detector by scanning the monochromator over the wavelength range $\lambda_o$ to $\lambda_n$. To select the DRS+ section of data for fitting, the derivatives of the DRS spectrum data are calculated. Taking derivatives tends to magnify the noise in the DRS spectrum, therefore the data is digitally filtered (smoothed) before the derivatives are taken. Methods for smoothing or filtering data are well known. Suitable methods are described in Chapters 12, 13 and 14 of *Numerical Recipes* by W. H. Press, B. P. Flannery, S. A. Teukolsky, W. T. Vetterling, Cambridge University Press, New York, 1989. The filtered data will be referred to as $\overline{DRS}$. Methods for determining the derivatives of data are well known, and a suitable method is described for example in *Numerical Analysis* 4th ed., PWS-KENT Publishing Company, Boston, 1989.

The right hand limit (long wavelength limit) of the DRS+ data is determined by the wavelength at which the maximum of the first derivative of the $\overline{DRS}$ data occurs. The maximum of the first derivative is also the zero crossing of the second derivative. The central point of the DRS+ data is determined by the maximum of the second derivative of the $\overline{DRS}$ data. And the left hand limit (short wavelength limit) of the DRS+ data is given by the central point less the difference between the right hand side and the central point.

To speed up the fitting process of the DRS+ data to the asymptotic function (Eq. 2), the $\overline{DRS}$ data and its derivatives are used to estimate the parameter values of Eq. 2. This is done as follows: Estimate $x_o$ as the wavelength at which the second derivative of the $\overline{DRS}$ data is maximum. Estimate $m_2$ as the maximum value of the first derivative of the $\overline{DRS}$ data. Estimate $y_o$ as the value of the data point at the left hand side of the $\overline{DRS}$ data. Estimate the parameter, a, as $m_2$ divided by four times the maximum in the second derivative of the $\overline{DRS}$ data. And finally the term, $m_1$, is included in Eq. 2 to accommodate any slope in the background of the DRS spectrum. In general the background signal is the very small diffuse scattering of the chopped white light from the polished front surface of the substrate. The small signal from the front surface of the substrate has a negligible slope as a function of wavelength. Therefore $m_1$ is usually zero and not included as a fitting parameter in Eq. 2. However for robustness, the algorithm accommodates the larger amounts of stray chopped white light, with substantial slope, that might impinge onto the detector in a less than ideal situation, by including the parameter $m_1$ in the more general fit. Therefore if the slope (first derivative) of the $\overline{DRS}$ data is less than 5% of $m_2$ at the left hand side of the DRS+ data, $m_1$ is set to zero and excluded as a fitting parameter in Eq. 2. The slope at the left hand limit of the DRS+ data is about 4% of $m_2$ when the back ground has a slope of zero. If the slope of the $\overline{DRS}$ data is greater than or equal to 5% of $m_2$ at the left hand limit of the DRS+ data, $m_1$ is estimated as the value of the first derivative of the $\overline{DRS}$ data at the left hand limit of the DRS+ data.

The exact position the knee is located by fitting Eq. 2 to the DRS+ section of data. The fit is done using the nonlinear least squares Levenberg-Marquardt method. This method is explained in Chapter 14 of the book *Numerical Recipes* by Press et al. The temperature of the substrate is calculated from a predetermined calibration curve, which gives the temperature (T) as a function of the wavelength of the location of the knee ($\lambda_{knee}$) for a substrate of a given material, thickness, doping, and back surface texture. Methods for determining the calibration curve are described below.

Figure 6:
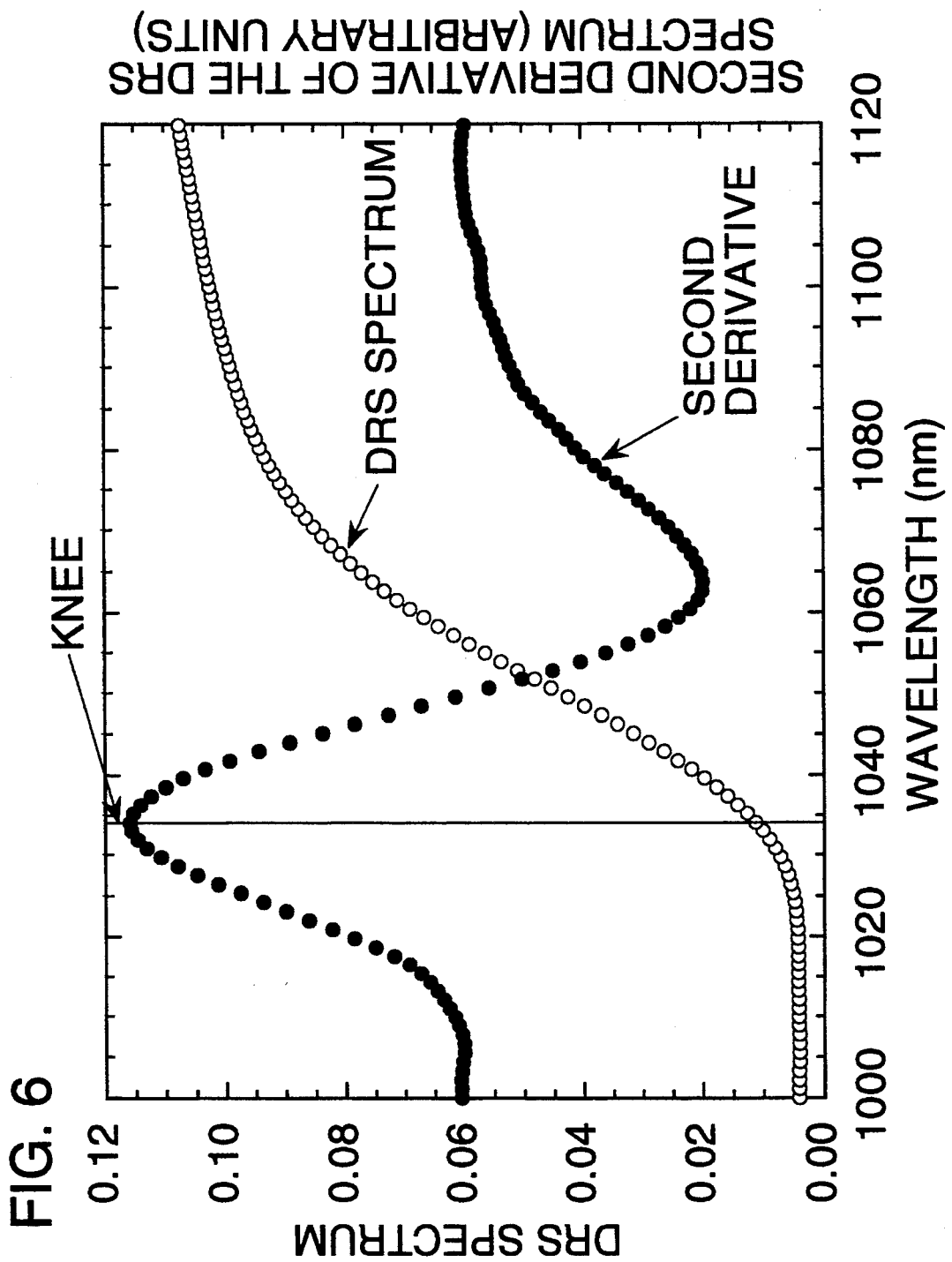
FIG. 6. Calculated second derivative of the diffuse reflectance spectrum using Algorithm B showing the location of the knee using this algorithm and its relationship to the experimental data.

In a second algorithm (algorithm B) the knee of the DRS spectrum data is mathematically determined by fitting a polynomial to the peak of the second derivative of the DRS spectrum and determining its maximum. This method follows from Algorithm A since the knee occurs at the maximum in the second derivative of the asymptotic fitting function, Eq. 2. Taking derivatives of data tends to magnify the noise in the DRS spectrum, therefore the data is digitally filtered before the derivatives are taken. In a preferred embodiment the data is filtered using a least squares moving quadratic fit where the number of data points used in the fit is determined by the amount of noise in the data and the goodness of fit to the DRS data that is required. Increasing the number of data points used in the fit produces a fit which is an average of the data points and hence is effective at smoothing out noise. Decreasing the number of data points fits the DRS spectrum more accurately but does not average out the noise as well. The DRS spectrum from a semi-insulating GaAs substrate, its second derivative, and the knee (determined by the peak in the second derivative) are shown in FIG. 6.

The flow chart for determining the position of the knee using the maximum of the second derivative (Algorithm B) is given in FIGS. 7a and 7b. The DRS signal versus wavelength is collected from the detector by scanning the monochromator over the wavelength range $\lambda_o$ to $\lambda_n$. The DRS data is filtered creating the $\overline{DRS}$ data set. The second derivative of the $\overline{DRS}$ data and its maximum value are determined. The top 30% of the peak in the second derivative is selected and referred to as the data set $f(\lambda i)$. A quadratic equation is fit to the data set $f(\lambda i)$. (Methods for fitting data with quadratic equations are well known. See for example *Numerical Recipes*, Chapter 14.) By fitting an equation to the second derivative peak one can obtain a more precise location of the wavelength at which the maximum in the second derivative occurs than by simply picking the maximum value. For example when the quadratic equation is of the form $g = g_o + c(z-z_o)^2$, where $g_o$ and c are constants, $z_o$ is the location of the maximum of the fitting function and in general will be at a location intermediate between the data points. The position of the DRS knee is given by $z_o$. The temperature of the substrate is calculated from the predetermined calibration curve, which gives the temperature (T) as a function of the wavelength of the location of the knee ($\lambda_{knee}$) for a substrate of a given material, thickness, doping, and back surface texture.

Algorithm B is faster than Algorithm A, because there are no nonlinear systems of equations that have to be solved. However Algorithm B is more sensitive to noise because it requires the second derivative of the DRS spectrum to be fit. Algorithm A on the other hand only uses derivatives to select the data to be fit and to get the initial parameter values for the fit. The actual fit is done to a large section of raw data (30 to 60 data points) making it very insensitive to data noise. Using Algorithm A the temperature sensitivity of the DRS technique is better than 0.2° C. for average quality data, where Algorithm B only achieves this sensitivity for data with a good signal to noise ratio (high quality data). For example the temperature analysis of DRS data from substrates with low subgap absorption (such as semi-insulating GaAs) works equally well using either algorithm. However Algorithm A is superior for analyzing the noisier data from conducting substrates with high subgap absorption such as n+ GaAs.

The following table contains a summary of the symbols used to represent the processed data sets referred to in the above algorithms:

| | |
|---|---|
| Filtered (smoothed) DRS data | $\overline{DRS}$ |
| First derivative of the $\overline{DRS}$ data | $\dfrac{d\overline{DRS}}{d\lambda}$ |

| Second derivative of the $\overline{DRS}$ data | $\dfrac{d^2\overline{DRS}}{d\lambda^2}$ |
| --- | --- |
| Section of DRS data with positive curvature | DRS+ |
| Data set containing the top 30% of the peak in the second derivative of the $\overline{DRS}$ data | $f(\lambda_i)$ |

In order to obtain an accurate value for the absolute temperature of the substrate as a function of the wavelength of the knee in the DRS spectrum, a temperature calibration curve is required. The simplest method is to look up the temperature dependence of the bandgap for the material of interest in a handbook such as the Landolt-Bornstein Tables, assume that the knee occurs at the bandgap, and from the handbook values for the bandgap and the wavelength of the knee determine the temperature. A standard reference for the temperature dependence of the bandgap of GaAs is C. D. Thurmond, J. Electrochem. Society, vol. 122, p. 1133 (1975). This method of calibrating the temperature will be adequate for many applications. However for best accuracy a calibration against another temperature sensor is required.

Figure 8:
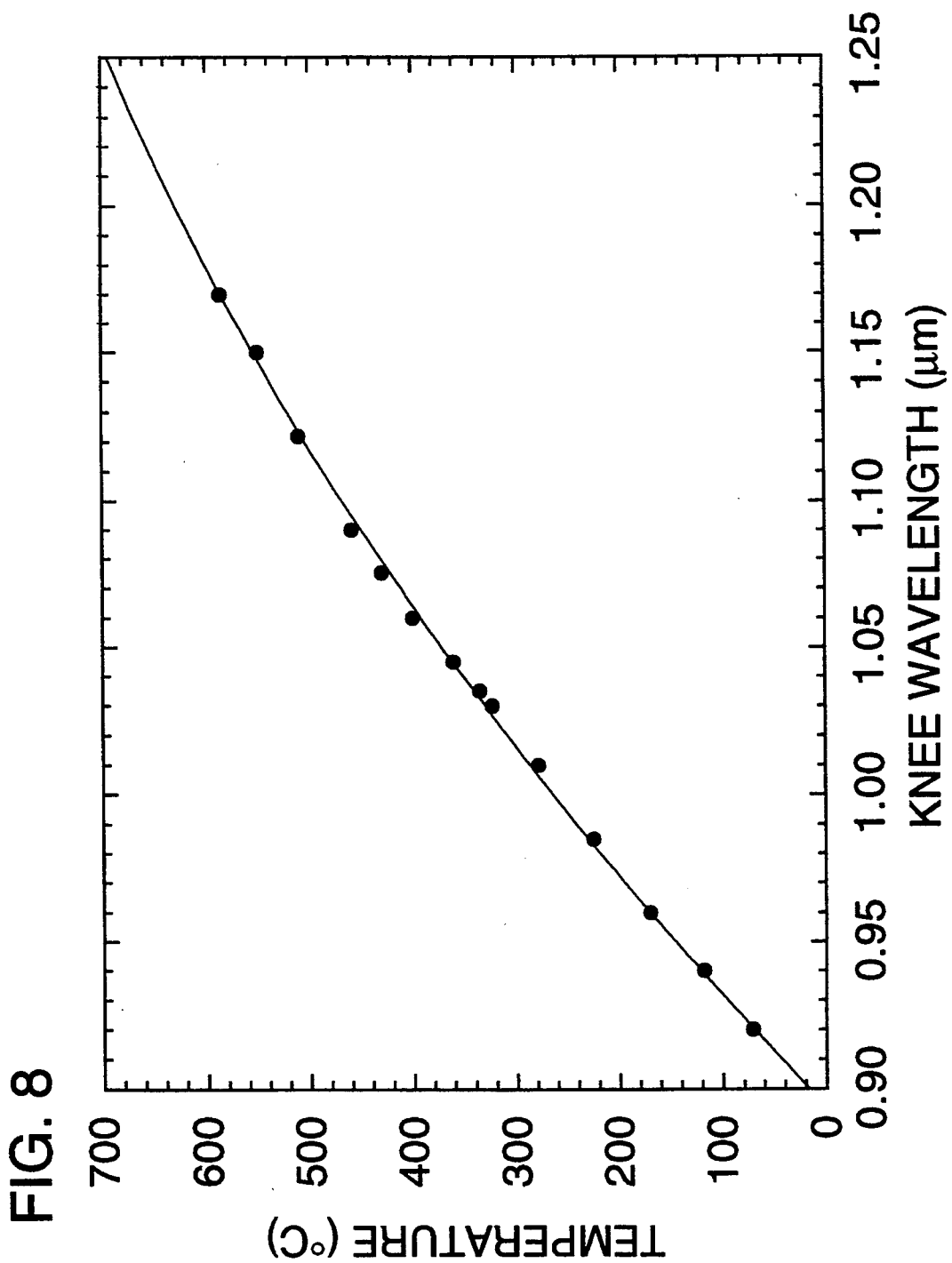
FIG. 8. Temperature of a semi-insulating GaAs wafer as a function of the wavelength of the knee in the diffuse reflectance spectrum.

The wavelength of the knee can be calibrated by measuring DRS spectra for a series of temperatures on a substrate with a thermocouple temperature sensor clipped to it. The measured wavelengths of the knee at each temperature are then interpolated with a polynomial fit to obtain an expression for the temperature of the substrate for arbitrary wavelength of the knee. The temperature as a function of the wavelength of the knee for a semi-insulating 450 μm thick GaAs wafer is plotted in FIG. 8. The smooth curve in FIG. 8 is a fit to the calibration data points given by:

$$T_{SI} = -4156 + 6583\lambda_{knee} - 2163\lambda_{knee}^2. \qquad (3)$$

In a preferred embodiment this function is incorporated into the computer software and allows the temperature of the substrate to be determined from the knee in the DRS spectrum by the computer. A separate calibration curve is required for each type of substrate material.

Figure 9:
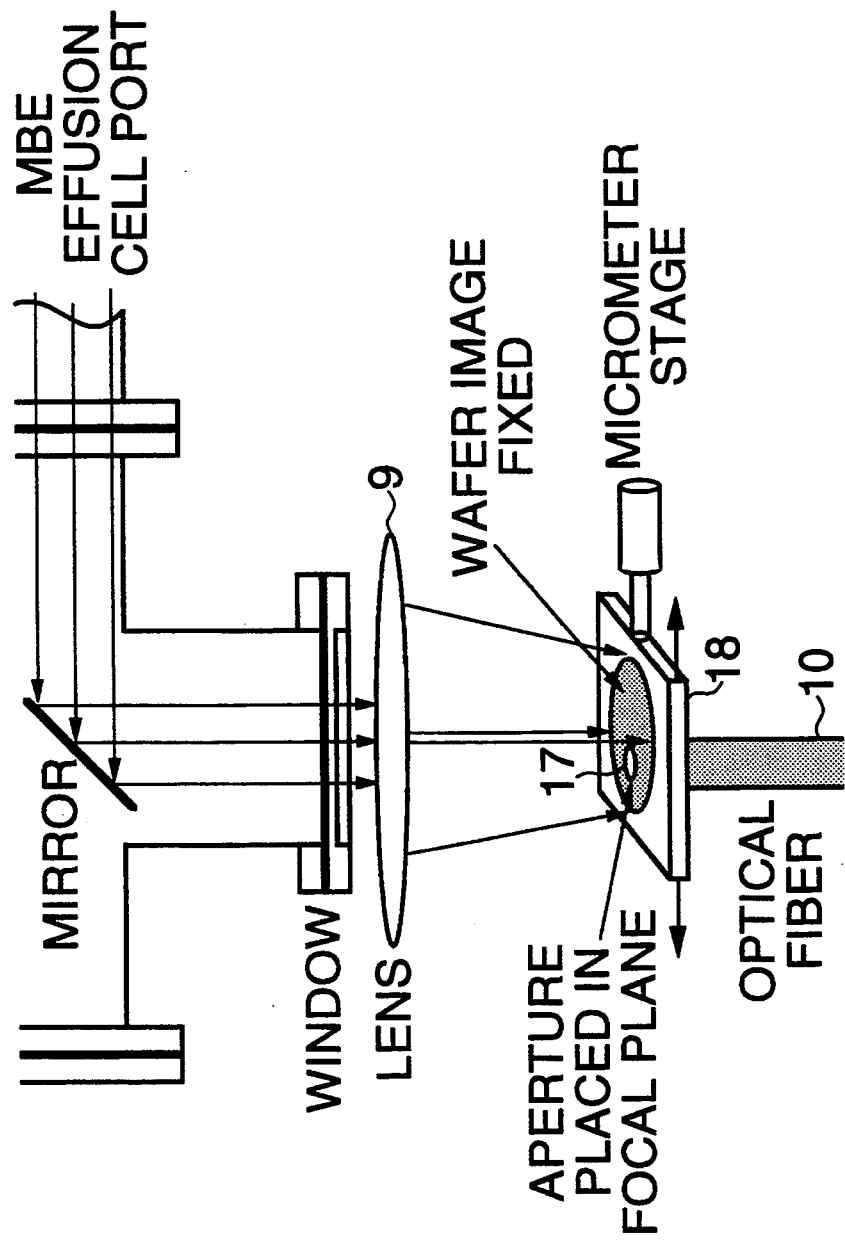
FIG. 9. Optical apparatus for profiling the temperature of the substrate.
Figure 10:
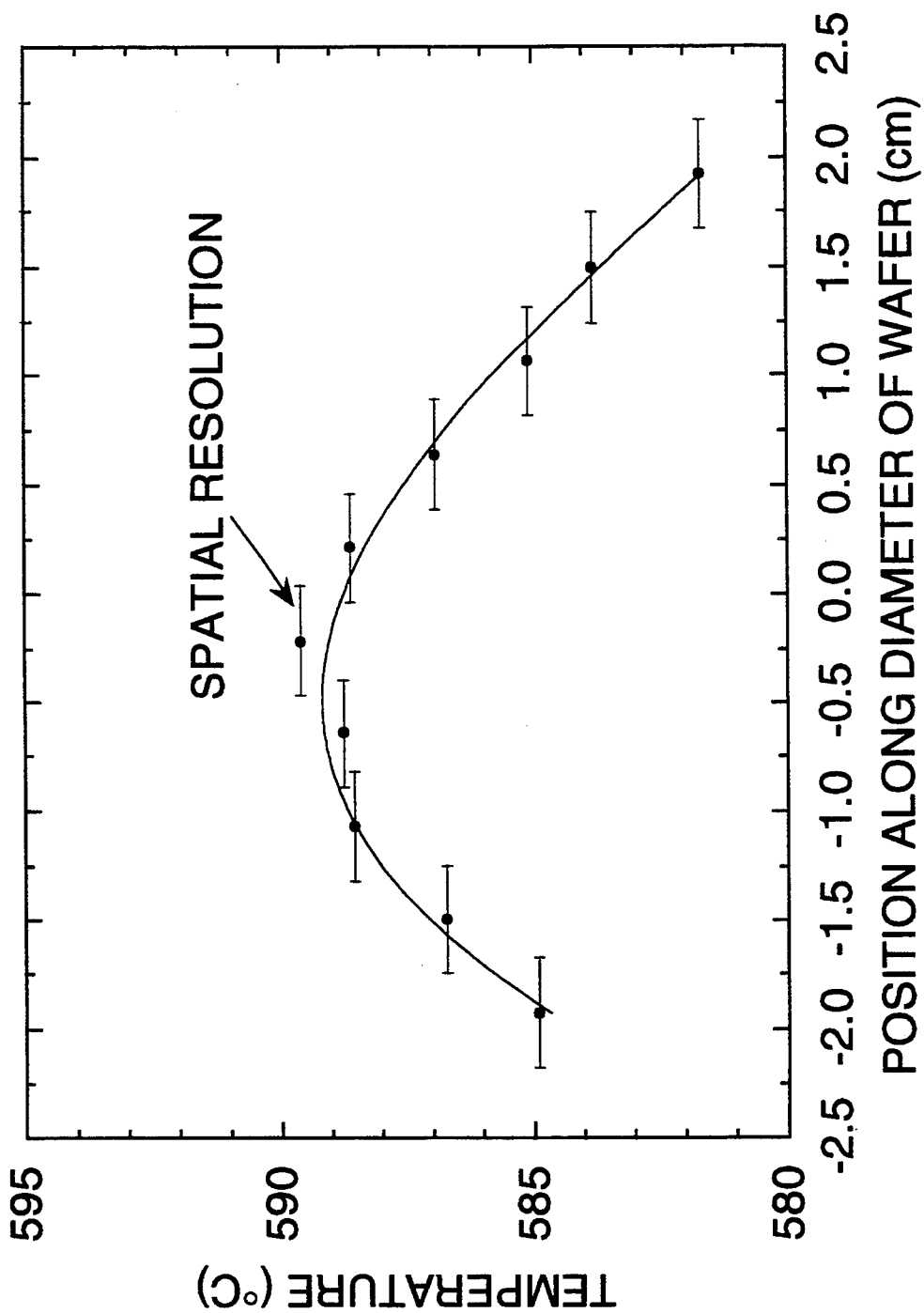
FIG. 10. Temperature profile of a two inch diameter GaAs wafer.

As a first step in minimizing temperature gradients in the substrate it is necessary to measure the temperature profile across the surface of the substrate. The DRS technique is well-suited to temperature profiling. The substrate is illuminated in the region to be profiled by the broad spectrum chopped light source as described above. The optical detection system is modified to profile the substrate temperature as shown in FIG. 9. The illuminated substrate is imaged with the collection lens 9 onto an adjustable aperture 17 in front of the optical fiber bundle 10. The area of the wafer of interest can be selected by locating its position in the image of the brightly lit substrate and substrate holder and moving the appropriate location on the image so that it lines up with the hole in the aperture. In a preferred embodiment the aperture has a diameter of 0.7 mm which for a 3 in focal length collection lens 9 corresponds to a spatial resolution of about 5 mm at the usual working distances in a commercial Vacuum Generators MBE system. The temperature profile in a line across the substrate can be obtained by scanning the aperture across the image of the substrate, while measuring the DRS spectrum at each location. In the preferred embodiment the aperture and fiber bundle 10 are scanned together with a micrometer driven stage 18 to avoid any possible complications associated with changes in the optical path of the light as it passes through the fiber bundle and into the monochromator. The temperature profile determined in this way across a 2 inch semi-insulating GaAs wafer is shown in FIG. 10.

Figure 11:
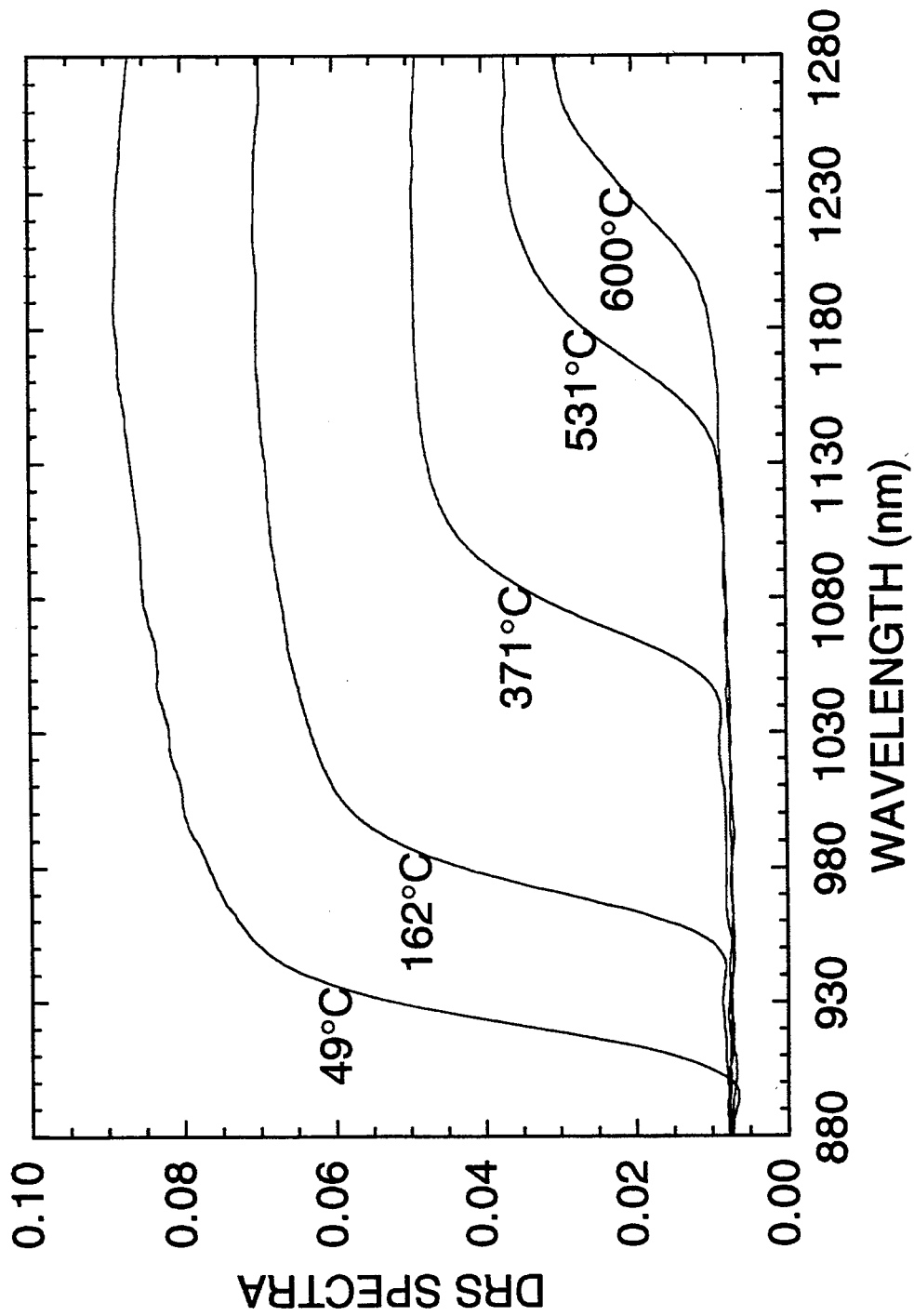
FIG. 11. Diffuse reflectance spectra for an n-type conductive GaAs wafer at a series of different temperatures.

The DRS technique can be applied to other materials in addition to semi-insulating GaAs. For example in FIG. 11 we show the DRS signal as a function of temperature for an n+ GaAs wafer doped to a carrier density of $3 \times 10^{18}$ cm$^{-3}$ with silicon donors. The free carrier absorption reduces the amplitude of the DRS signal at long wavelengths particularly at high temperatures as shown in FIG. 11, however the knee in the spectrum is still clearly defined up to at least 700° C.

Figure 12:
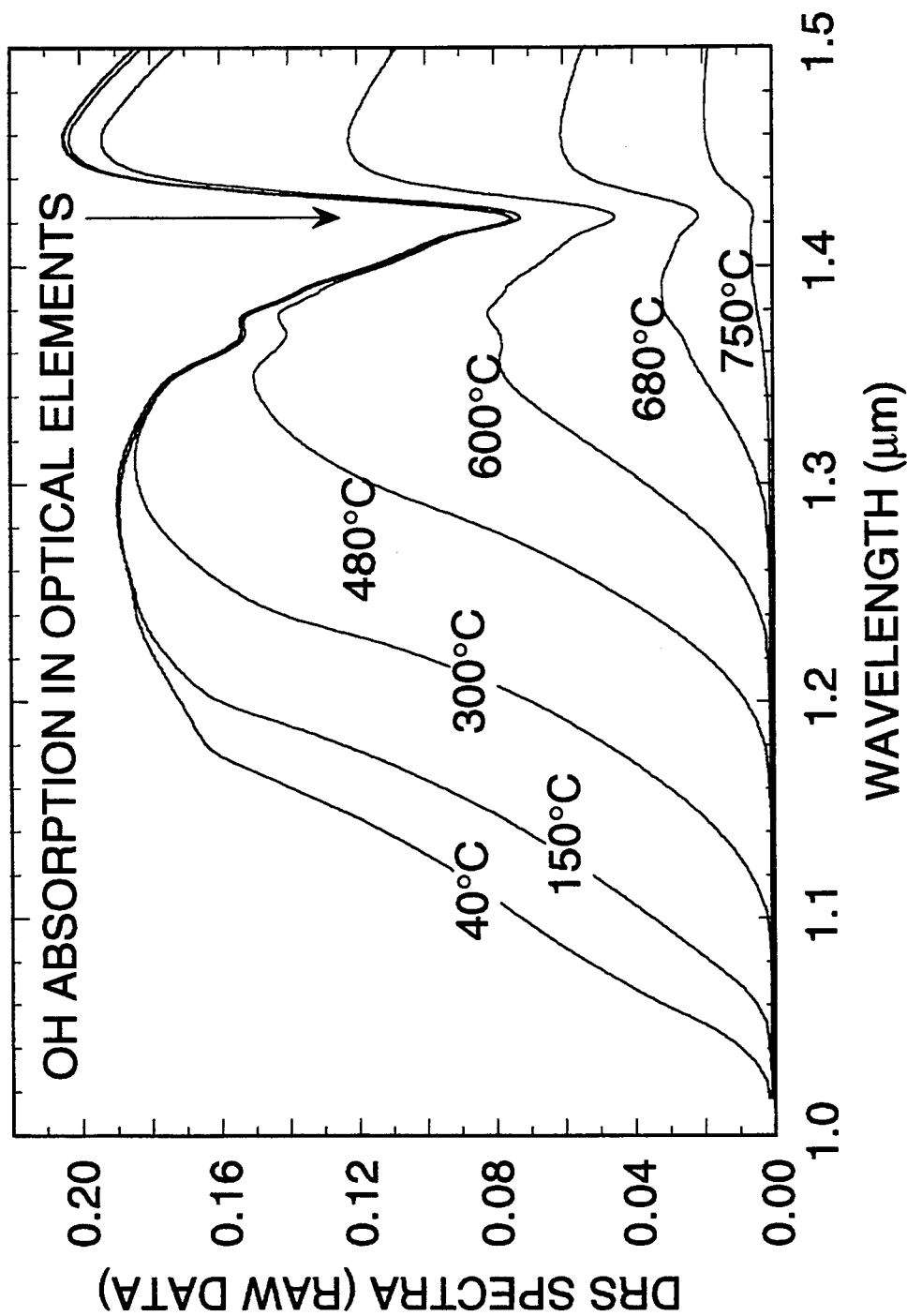
FIG. 12. Diffuse reflectance spectra for a silicon wafer at a series of different temperatures.

It is well known that silicon is an indirect bandgap semiconductor in contrast to GaAs which is a direct gap semiconductor. A practical effect of this property of silicon is that its optical absorption for photon energies just above the threshold for absorption at the bandgap is not as strong as it is in direct gap materials such as GaAs. In addition the absorption edge is broadened by the phonons that are involved in the indirect optical transitions. In spite of these differences between the optical properties of silicon and GaAs the DRS technique also works well for measuring the temperature of silicon substrates. A series of DRS spectra measured for a silicon wafer substrate at different temperatures is shown in FIG. 12. The prominent "dip" in the DRS spectra at a wavelength of 1.42 mm is due to absorption by OH species in the optical elements in the detection system, believed to be principally in the optical fiber bundle. Because silicon has a smaller bandgap than GaAs (1.1 eV compared with 1.4 eV at room temperature) the intrinsic thermally generated free carrier density is higher in silicon than in GaAs. This shows up in FIG. 12 as a reduction in the amplitude of the DRS signal at high temperatures in silicon due to absorption of the scattered light by the thermally generated free carriers. Nevertheless the knee in the DRS spectrum can be accurately located up to at least 800° C. in silicon.

U.S. Pat. No. 5,118,200 provides an algorithm for determining the temperature of GaAs wafers from the specular transmission spectrum. In this algorithm the point of inflection of the transmission spectrum in the vicinity of the bandgap is used as the spectral reference point for purposes of determining the temperature. In the present analysis of the non-specular DRS spectra the spectral feature that is used as the reference point is the knee in the spectrum found using one of the algorithms described above. We show that the knee is less sensitive to the optical scattering characteristics of the back surface than the inflection point. This is important for the accuracy of the temperature measurements because the scattering characteristics of the back surface are difficult to quantify, vary with preparation conditions and change during film growth as pointed out above. A theoretical model for the diffuse reflectance spectrum in terms of the thickness, optical properties and absorption coefficient of the substrate has been developed by Weilmeier et al. In this model the back surface of the wafer is assumed to be textured in such a way that the scattering from the back surface has a Lambertian angular distribution (cosine law). This is the angular distribution one would expect for a perfectly scattering surface. In this case the DRS spectrum is given by, $$DRS = \frac{(1 - r_f)^2 r_b}{n^2 \exp(2ad) - r_f r_b - (n^2 - 1)\exp(-2ad)}, \quad (4)$$

where the absorption coefficient a is a function of wavelength, n is the index of refraction of the substrate, $r_f$ is the front surface reflectivity, $r_b$ is the back surface reflectivity and d is the substrate thickness. To take account of the fact that the back surface may be less than a perfect scatterer, or in other words more of the light may be scattered inside the escape cone than in the maximally scattering case, we introduce a new parameter $\beta (0 \leq \beta \leq 1)$ in the expression in Eq. 4 above for the DRS spectrum and obtain the following interpolation formula which simulates the effect of varying degrees of scattering at the back surface:

$$DRS = \frac{(1 - r_f)^2 r_b}{\exp(2ad) - r_f r_b + 2\beta(n^2 - 1)\sinh(2ad)}. \quad (5)$$

The case $\beta = 0$ corresponds to the limit where none of the light is scattered outside the escape cone, which is similar to the specular case in the sense that the light rays making up the DRS signal experience only a single round trip through the substrate with no multiple reflections; similarly $\beta = 1$ corresponds to the perfectly scattering back surface as in Eq. 4.

Figure 13:
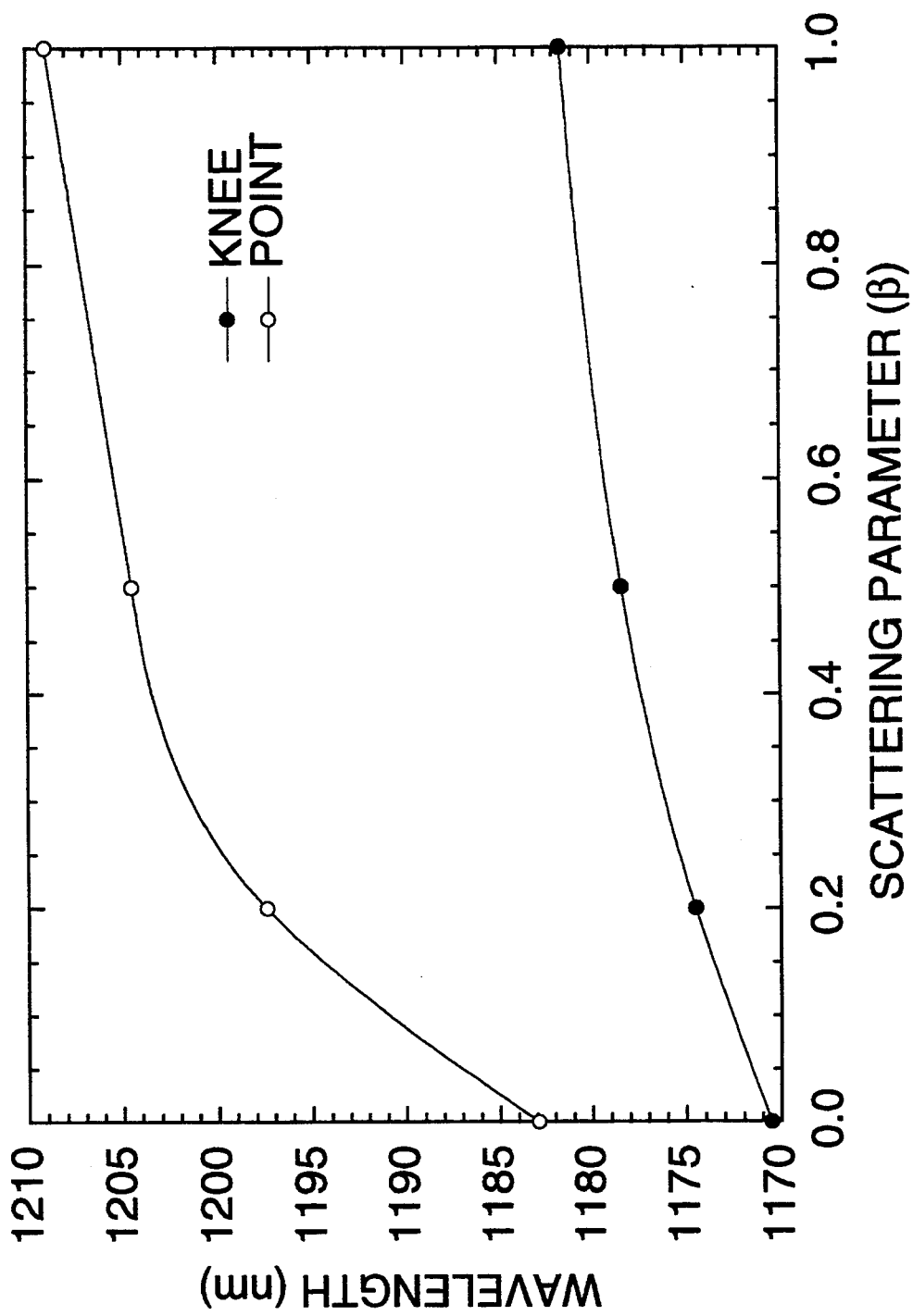
FIG. 13. Model calculation of the wavelength of the point of inflection and the wavelength of the knee as a function of the light scattering efficiency of the back surface of the substrate.

In FIG. 13 the knee and the inflection point in the DRS spectrum are plotted as a function of the scattering parameter $\beta$ for a synthetic DRS spectrum designed to model GaAs. Ideally one would like the spectral feature used to determine the temperature (either the knee or the inflection point) to be independent of the optical scattering characteristics of the back surface for maximum accuracy in the temperature measurements. Note in FIG. 13 that the wavelength of the knee is less sensitive to the scattering parameter $\beta$ than the point of inflection.

Figure 14A:
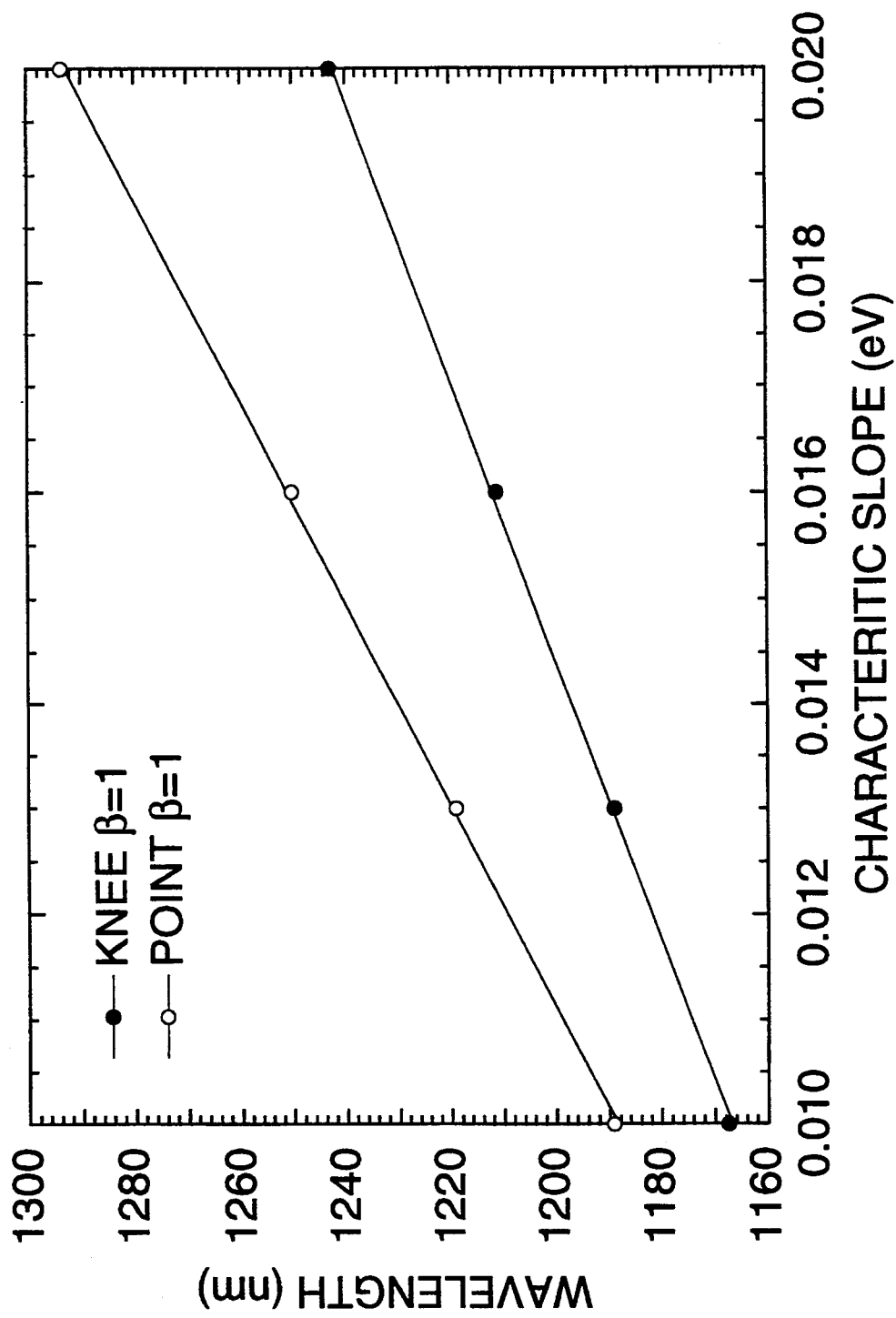

Another, difficult to quantify, property of the substrate that affects the accuracy of the temperature measurement is the slope of the optical absorption edge frequently referred to as the Urbach edge. The optical absorption at photon energies just below the bandgap in semiconductors normally has an exponential dependence on photon energy. The characteristic energy $\epsilon_0$ (or slope parameter) of this exponential depends on temperature, crystalline perfection and impurity concentration. For example as shown by Casey et al (J. Appl. Phys. vol. 46, p. 250 (1975)), the characteristic energy of the optical absorption edge in GaAs varies from 0.006 eV to 0.02 eV with increasing dopant concentration. To avoid systematic temperature errors, the spectral analysis procedure in DRS should be insensitive to changes in the slope parameter of the absorption edge. In FIGS. 14a and 14b we show the dependence of the wavelength of the knee and the wavelength of the point of inflection as a function of the characteristic energy (0.01 eV $< \epsilon_0 <$ 0.02 eV) calculated for the model DRS spectrum given by Eq. 5 above, for $\beta = 1$ (FIG. 14a) and for $\beta = 0$ (FIG. 14b). Once again the knee wavelength is less sensitive to changes in the slope of the absorption edge than the point of inflection.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for measuring the temperature of a substrate material by inference from its band gap measured by diffuse reflectivity comprising:
   (a) white light lamp means for emitting broad spectrum white light;
   (b) focusing means for focusing the white light emitted from the lamp means upon a front surface of a substrate material which is polished on the front surface and is polished or textured on a back surface, said white light being specularly reflected from the front surface of the substrate material and non-specularly reflected from the back surface of the substrate material;
   (c) a diffuser means located adjacent the back surface of the substrate material for non-specularly reflecting the white light emitted from the lamp means;
   (d) detector means positioned at a non-specular position on the front side of the substrate material for detecting non-specularly reflected white light from the back surface of the substrate material;
   (e) optical fibre bundle means for collecting non-specularly reflected light detected by the detector means; and
   (f) computing means for determining a temperature dependent band gap from onset wavelength of non-specular reflection from the back surface of the substrate material transmitted through the optical fibre bundle means.

2. An apparatus as claimed in claim 1 wherein the optical fibre bundle means has a circular cross-section at its entrance and a rectangular cross-section at its exit.

3. An apparatus as claimed in claim 2 wherein light chopping means are positioned between the white lamp means and the focusing means.

4. An apparatus as claimed in claim 3 wherein the focusing means is a mirror.

5. An apparatus as claimed in claim 4 including filter means for filtering white light emitted from the white light lamp means before the light is transmitted to the mirror.

6. An apparatus as claimed in claim 5 wherein the filtering means eliminates short wavelength light not close to the band gap of the substrate material.

7. An apparatus as claimed in claim 6 including light chopping means positioned between the white light lamp means and the focusing means.

8. An apparatus as claimed in claim 7 wherein the detector means includes a first collective lens which collects non-specularly reflected light and focuses the light into the optical fibre bundle means.

9. An apparatus as claimed in claim 8 wherein the light focused through the optical fibre bundle means is passed through a second collecting lens before being transmitted into the detector means.

10. An apparatus as claimed in claim 9 wherein the detector means is sensitive to wavelengths of non-specular light spanning an optical band gap at the temperature of the substrate material.

11. An apparatus as claimed in claim 10 including a monochromating means positioned between the optical fibre bundle means and the computing means.

12. An apparatus as claimed in claim 11 including adjustable aperture means positioned between the first collecting means and the optical fibre bundle means, the first collecting means projecting an image of non-specular reflected light onto the adjustable aperture means.

13. An apparatus as claimed in claim 12 wherein the aperture means and optical fibre bundle means are connected to a micrometer driven stage.

14. An apparatus as claimed in claim 12 wherein the diffuser means comprises a pyrolytic boron nitride diffuser plate located behind the substrate material, said plate being attached to a holding means upon which the substrate material is held.

15. An apparatus as claimed in claim 3 wherein the computing means includes a monochromating means which transmits process data to the computing means, and a cooled InGaAs detector means connected to the monochromating means, the data from the computer means and the cooled InGaAs detector means being transmitted to a lock-in amplifying means, which is connected to the chopping means.

16. An apparatus as claimed in claim 15 wherein the substrate material is silicon.

17. An apparatus as claimed in claim 16 wherein the diffuser means comprises a pyrolytic boron nitride diffuser plate attached to a holding means upon which the substrate material is held.

* * * * *